US009948925B2

(12) United States Patent
Lee et al.

(10) Patent No.: US 9,948,925 B2
(45) Date of Patent: Apr. 17, 2018

(54) MODULATOR FOR STEREOSCOPIC IMAGE DEVICE AND STEREOSCOPIC IMAGE DEVICE USING SAME

(71) Applicant: RealD Inc., Beverly Hills, CA (US)

(72) Inventors: Chul Woo Lee, Seongnam-si (KR); Sung Ho Cho, Seoul (KR)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 15/122,932

(22) PCT Filed: Jan. 29, 2015

(86) PCT No.: PCT/KR2015/000963
§ 371 (c)(1),
(2) Date: Sep. 1, 2016

(87) PCT Pub. No.: WO2015/133732
PCT Pub. Date: Sep. 11, 2015

(65) Prior Publication Data
US 2017/0078656 A1    Mar. 16, 2017

(30) Foreign Application Priority Data

Mar. 4, 2014    (KR) .................. 10-2014-0025711
Mar. 12, 2014   (KR) .................. 10-2014-0029108
Jun. 5, 2014    (KR) .................. 10-2014-0068169

(51) Int. Cl.
*H04N 13/04*       (2006.01)
*G02B 27/22*       (2018.01)
(Continued)

(52) U.S. Cl.
CPC ......... *H04N 13/0497* (2013.01); *G02B 27/22* (2013.01); *G02B 27/2264* (2013.01);
(Continued)

(58) Field of Classification Search
CPC   G02B 27/2214; G02B 27/22; G02B 27/2278; G02B 27/283; G02B 27/2264;
(Continued)

(56) References Cited
U.S. PATENT DOCUMENTS 5,283,600 A    2/1994 Imai
5,315,377 A *  5/1994 Isono .................... G03B 35/24
                                                345/419
(Continued)

FOREIGN PATENT DOCUMENTS

CN    203405635 U    1/2014
EP       2869116 A1   5/2015
(Continued)

OTHER PUBLICATIONS

International Search Report and Written Opinion of the International Searching Authority dated May 8, 2015 for Application No. PCT/KR2015/000963.
(Continued)

*Primary Examiner* — Joseph L Williams
*Assistant Examiner* — Jose M Diaz
(74) *Attorney, Agent, or Firm* — Penny L. Lowry; Neil G. Mothew

(57) ABSTRACT

The present invention relates to a modulator for a stereoscopic image device, comprising: two spaced substrates; two electrodes provided between the substrates; and a liquid crystal unit provided between the electrodes, wherein at least one of the two substrates is divided into a plurality of electrodes, each of which is formed to be insulted, such that a plurality of different voltages can be applied.

14 Claims, 17 Drawing Sheets

(51) Int. Cl.
  *G03B 35/26* (2006.01)
  *G02B 27/26* (2006.01)
  *G02B 27/28* (2006.01)
  *G02F 1/1343* (2006.01)
  *G02F 1/139* (2006.01)

(52) U.S. Cl.
  CPC ........... *G02B 27/26* (2013.01); *G02B 27/283* (2013.01); *G02F 1/1393* (2013.01); *G02F 1/134309* (2013.01); *G03B 35/26* (2013.01); *H04N 13/0459* (2013.01); *H04N 13/0438* (2013.01)

(58) Field of Classification Search
  CPC .. G02B 27/26; H04N 13/0497; G02F 1/1393; G02F 1/134309; G03B 35/26
  See application file for complete search history.

(56) References Cited

U.S. PATENT DOCUMENTS

| | | | | |
|---|---|---|---|---|
| 6,094,216 | A * | 7/2000 | Taniguchi | G09G 3/003 348/51 |
| 2008/0123173 | A1* | 5/2008 | Kim | G02B 27/26 359/246 |
| 2011/0242490 | A1 | 10/2011 | Itoh | |
| 2012/0133878 | A1* | 5/2012 | Hirakata | G02F 1/133528 349/141 |
| 2013/0057533 | A1* | 3/2013 | Baek | H04N 5/70 345/211 |
| 2013/0141402 | A1* | 6/2013 | Lee | G09G 3/003 345/204 |
| 2014/0132850 | A1 | 5/2014 | Otani et al. | |
| 2015/0331297 | A1* | 11/2015 | Han | G03H 1/2294 359/9 |

FOREIGN PATENT DOCUMENTS

| | | |
|---|---|---|
| JP | H07-072428 A | 3/1995 |
| JP | H07-146474 A | 6/1995 |
| JP | H07-301779 A | 11/1995 |
| JP | H11-260141 A | 9/1999 |
| JP | 2004-138433 A | 5/2004 |
| JP | 2009-529149 A | 8/2009 |
| JP | 2010-506199 A | 2/2010 |
| JP | 2010-528323 A | 8/2010 |
| KR | 10-2009-0094224 A | 9/2009 |
| KR | 10-2012-0091414 A | 8/2012 |
| KR | 10-2013-0129256 A | 11/2013 |
| WO | 2008/047800 A1 | 4/2008 |

OTHER PUBLICATIONS

Korean Notice of Allowance in Appln. No. 10-2014-0029108 dated Nov. 28, 2014 with English translation.
EP-15758266.9 European Extended Search Report of European Patent Office dated Feb. 9, 2017.
JP 2016-554841 Notice of reasons for rejection with translation dated Sep. 19, 2017.

* cited by examiner

ANGLE OF INCIDENCE

High voltage (a)  Low voltage (b)

MODULATOR FOR STEREOSCOPIC IMAGE DEVICE AND STEREOSCOPIC IMAGE DEVICE USING SAME

CROSS-REFERENCE TO RELATED APPLICATIONS

This application is the National Stage filing under 35 U.S.C. 371 of International Application No. PCT/KR2015/000963, filed on Jan. 29, 2015, which claims the benefit of Korean Patent Application No. 10-2014-0025711, filed on Mar. 4, 2014, Korean Patent Application No. 10-2014-0029108, filed on Mar. 12, 2014, and Korean Patent Application No. 10-2014-0068169, filed on Jun. 5, 2014, the contents of which are all hereby incorporated by reference herein in their entirety.

TECHNICAL FIELD

The following description relates to a modulator for a stereoscopic image device configured to minimize crosstalk of a stereoscopic image and a high-luminance stereoscopic image device using the same and, more particularly, to a stereoscopic image device capable of solving an optical path difference problem caused due to a beam splitter and an efficiency problem of a reflection member.

BACKGROUND ART

FIG. 1 is a schematic diagram showing a stereoscopic image implementation method using a general projector, a modulator and 3D glasses.

An image generated by the projector 1 is converted into linearly polarized light to be transmitted through the modulator 2. By driving the modulator 2 using a signal linked with the projector 1, image light transmitted through the modulator 2 is modulated into circularly polarized light in a clockwise or counterclockwise direction and is radiated onto a screen. Image light reflected from the screen may be presented to a viewer as a stereoscopic image through the 3D glasses 4.

FIG. 2 is a diagram showing the configuration of a conventional modulator.

Linearly polarized incident light is emitted by sequentially passing through a transparent substrate 9, a transparent electrode 8, a liquid crystal (LC) layer 7, a transparent electrode 6 and a transparent electrode 5.

The transparent electrodes 6 and 8, which are spaced apart from each other, are driven by a voltage drive device 10 using different voltages, such that the emitted light is converted into circularly polarized light in a clockwise or counterclockwise direction.

FIG. 3 is a diagram showing a light traveling path in an LC layer according to an angle of incidence of incident light.

If the angle of incidence is not perpendicular to the LC layer 13 and is $\theta_1$, a difference between the thickness d of the LC layer 13 and the length l of the beam of light transmitted through the LC layer 13, that is, (l–d), is as follows.

$$l-d=d(1/\text{Cos}\,[A\,\text{Sin}\,\{(n_1/n_2)\text{Sin}\,\theta_1\}]-1) \quad \text{Equation 1}$$

where, $n_1$ denotes a refractive index of air and is 1 and $n_2$ denotes a refractive index of the LC layer and is about 1.5.

FIG. 4 is a diagram showing an optical path difference (l–d)/d according to change in angle of incidence $\theta_1$ based on Equation 1.

In FIG. 4, an optical path difference of 0% corresponds to the case where light is perpendicularly incident on the LC layer. When the angle of incidence increases, l becomes greater than d and thus the optical path difference increases.

A maximum angle of incidence is determined by a throw ratio (TR; distance between the projector and the screen/width of the screen) of the stereoscopic image system. For example, the maximum angle of incidences when the TR is 1.5 and 1.3 are about 18 degrees and 21 degrees, respectively.

Accordingly, the optical path differences are 2.1% (in the case of 18 degrees) and 3.0% (in the case of 21 degrees). Since polarization conversion efficiency is proportional to the optical path difference, phase retardation occurs. Circularly polarized light conversion efficiencies of light passing through the center part and outermost part of the modulator are respectively 2.1% and 3.0% due to the optical path difference.

TR is 1.3 and a value obtained by averaging the optical path differences when the angle of incidence is 1 to 24 degrees is 1.4%.

By this difference, crosstalk occurs in images perceived by the left and right eyes through the 3D glasses 4, such that the image quality of the stereoscopic image deteriorates.

As described above, in addition to the problem of the modulator for the stereoscopic image device, the stereoscopic image device using the beam splitter for high-luminance stereoscopic image implementation has the following problems.

FIG. 5 is a side view of a beam splitter used in a stereoscopic image device for high-luminance stereoscopic image implementation.

As shown in FIG. 5, in the beam splitter used in the stereoscopic image device, when light having a mixture of P-polarized light and S-polarized light is input to the beam splitter 1, the P-polarized light may be transmitted and the S-polarized light may be reflected. The reflected S-polarized light may be reflected from a mirror 2 provided at the upper side of the beam splitter 1 and then pass through a half-wavelength retarder 4. The reflected S-polarized light may be converted into P-polarized light and then travel to the screen. The P-polarized light transmitted through the beam splitter 1 may pass through a prism 3 provided at the lower side of the beam splitter 1 and travel to the screen.

Although not shown in FIG. 5, as described above, light transmitted through the beam splitter may be modulated by the modulator shown in FIG. 2 and then projected onto the screen.

However, in order to apply such technology to the stereoscopic image device, the following conditions are necessary.

The image of the light emitted from the projector has a predetermined size. In order to implement a stereoscopic image having excellent efficiency and high image quality on the screen, the size of the image displayed on the screen by light traveling along a transmission path and the size of the image displayed on the screen by light traveling along a reflection path should be equal or similar to each other such that the two images overlap each other. That is, in the stereoscopic image device using the beam splitter in order to implement a high-luminance stereoscopic image, as an overlap ratio of lights passing through the two paths on the screen increases, the quality of the stereoscopic image may increase. There is a need for a means for compensating for a path difference between the path of the transmitted light and the path of the reflected light.

In addition, since the mirror 2 of the beam splitter is formed on the prism, manufacturing costs increase. In addition, when light is reflected from the mirror, light loss may occur.

DISCLOSURE

Technical Problem

An object of the present invention devised to solve the problem lies in a modulator for a stereoscopic image device capable of reducing crosstalk occurring in the center part and outer part of a stereoscopic image.

Another object of the present invention is to provide a stereoscopic image device using the modulator, which is capable of efficiently reducing influence caused due to an optical path difference between transmitted light and reflected light while additionally utilizing a beam splitter in order to implement a high-luminance stereoscopic image.

Another object of the present invention is to provide a high-luminance stereoscopic image device capable of increasing light use efficiency through total reflection in addition to or independently of the above-described invention.

The effects of the present invention are not limited to the above-described effects and other effects which are not described herein will become apparent to those skilled in the art from the following description.

Technical Solution

The object of the present invention can be achieved by providing a modulator for a stereoscopic image device including a first substrate and a second substrate spaced apart from the first substrate, first and second electrodes provided between the first substrate and the second substrate, and a liquid crystal part provided between the first electrode and the second electrode, wherein one or more of the first electrode or the second electrode is divided into a plurality of electrodes so as to apply a plurality of different voltages and the plurality of electrodes are insulated from one another.

In addition, a stereoscopic image device using the modulator includes a projector for projecting a stereoscopic image and a modulator for modulating the stereoscopic image projected by the projector into circularly polarized light in a clockwise or counterclockwise direction based on a signal linked with the projector.

The stereoscopic image device may further include a beam splitter for transmitting light having a first polarization direction and reflecting light having a second polarization direction among lights radiated from the projector.

In another aspect of the present invention, the stereoscopic image device may further include a plurality of unit prisms adhered to each other in the vicinity of the beam splitter to pass light input to the beam splitter and light transmitted or reflected by the beam splitter and a substrate for guiding incident light to the plurality of unit prisms in order to prevent light energy loss due to a tolerance occurring upon arranging the plurality of unit prisms in the vicinity of the beam splitter.

The stereoscopic image device may further include a prism for refracting and reflecting the light reflected by the beam splitter and radiating the light toward a screen. At this time, an angle of incidence of the light reflected by the beam splitter to a reflection surface of the prism is equal to or greater than a critical angle for totally reflecting the light reflected by the beam splitter toward the screen.

Advantageous Effects

According to the present invention, since the electrode is divided into a plurality of electrodes according to sections and different voltages are applied to the plurality of separated electrodes according to sections, it is possible to reduce phase retardation of polarized light due to an optical path difference of a modulator and to remarkably reduce crosstalk.

That is, since a low voltage is applied to a center electrode and a high voltage is applied to an outer electrode such that a liquid crystal pattern differs between sections, phase retardation differs between sections. Therefore, it is possible to reduce phase retardation due to an optical path difference.

Accordingly, it is possible to minimize crosstalk occurring in the center part and outer part of a stereoscopic image to obtain a high-quality stereoscopic image.

According to another aspect of the present invention, since the size of an image formed by reflected light and the size of an image formed by transmitted light may be equal upon utilizing a beam splitter for providing a high-luminance stereoscopic image, it is possible to improve image quality and luminance of a screen.

In particular, by providing a substrate in front of a prism, it is possible to suppress light loss caused due to a space formed between incident surfaces of the prism.

Further, by providing a refraction member in front of the substrate, it is possible to prevent light from entering the space formed between the incident surfaces of the prism. Therefore, it is possible to prevent dissipation of light.

In addition, by providing a lens on a transmission path or providing a reflection member-prism assembly on a reflection path, an image formed by reflected light may match an image formed by transmitted light. Therefore, it is possible to implement a high-quality stereoscopic image.

In addition, in addition to or independently of the above-described method, it is possible to implement a high-luminance stereoscopic image device capable of increasing light use efficiency using total reflection.

BEST MODE

Hereinafter, the embodiments of the present invention will be described with reference to the accompanying drawings.

Figure 1:
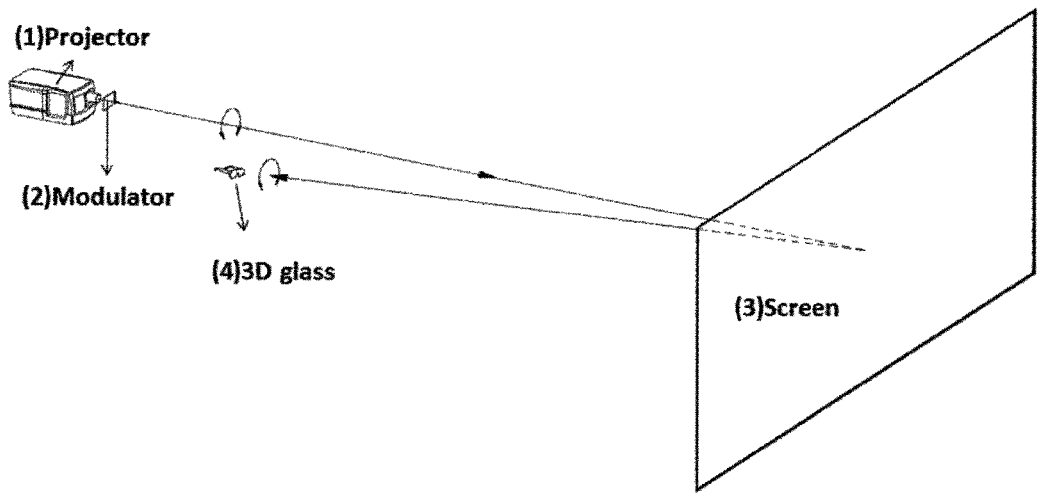
FIG. 1 is a schematic diagram showing a stereoscopic image implementation method using a general projector, a modulator and 3D glasses.
Figure 2:
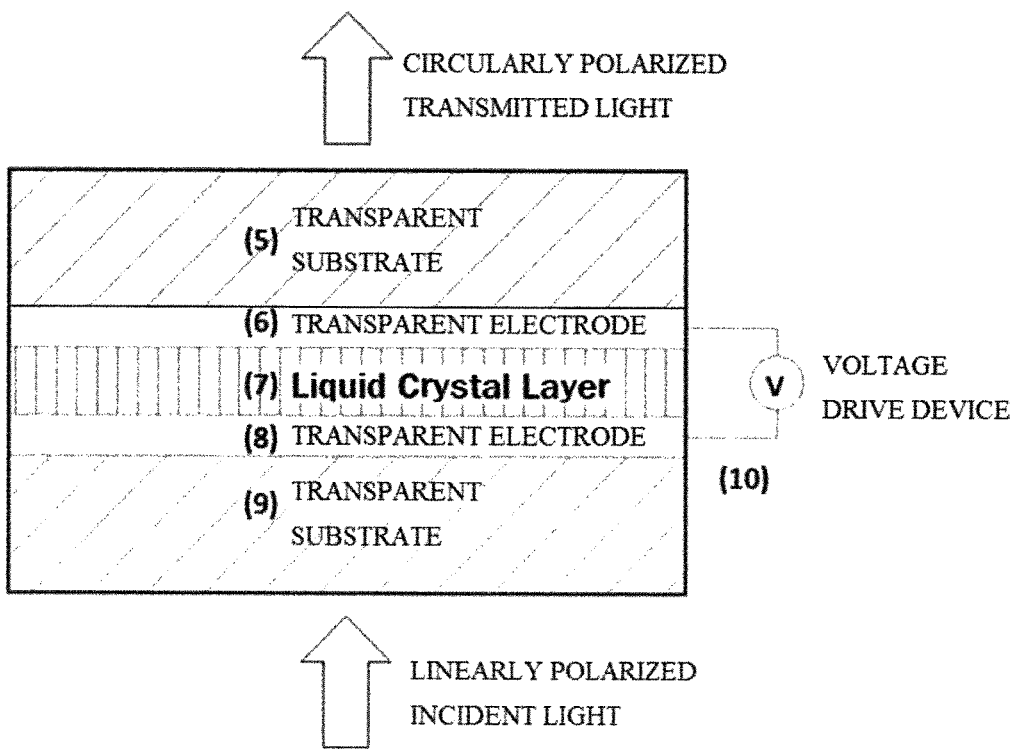
FIG. 2 is a diagram showing the configuration of a conventional modulator.
Figure 3:
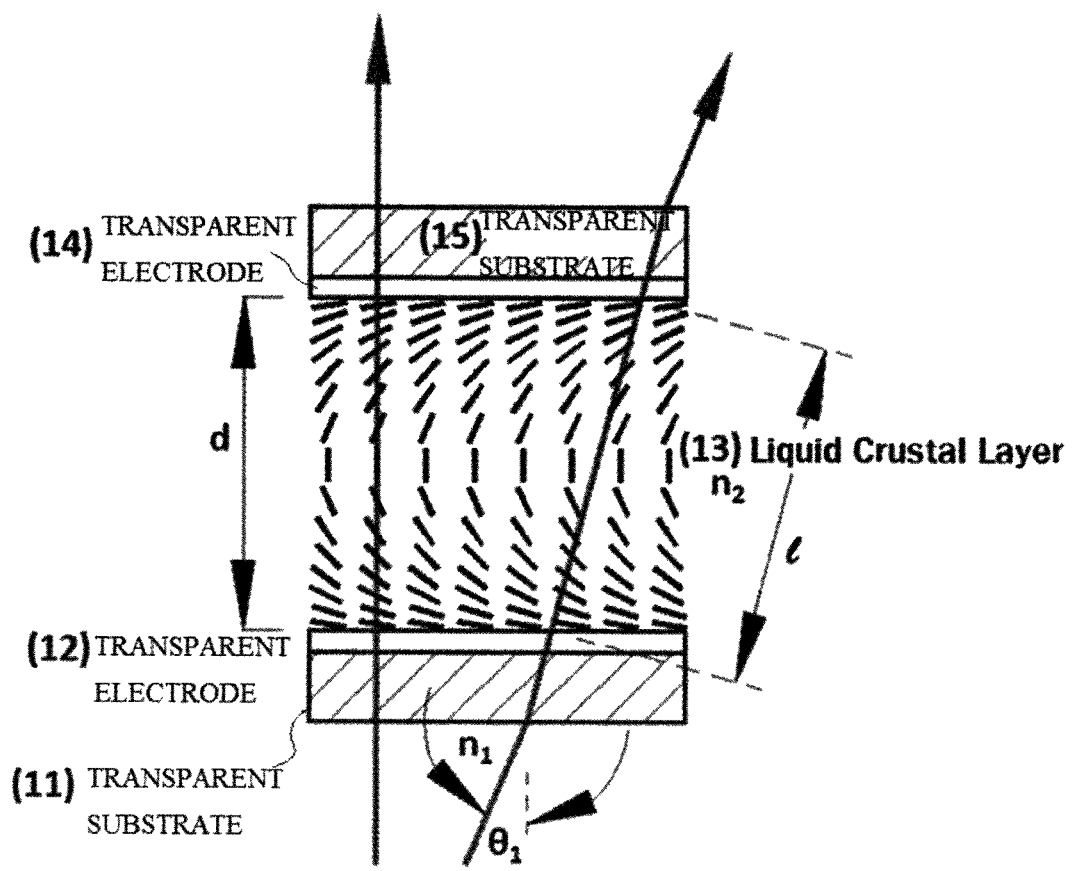
FIG. 3 is a diagram showing a light traveling path in an LC layer according to an angle of incidence of incident light.
Figure 4:
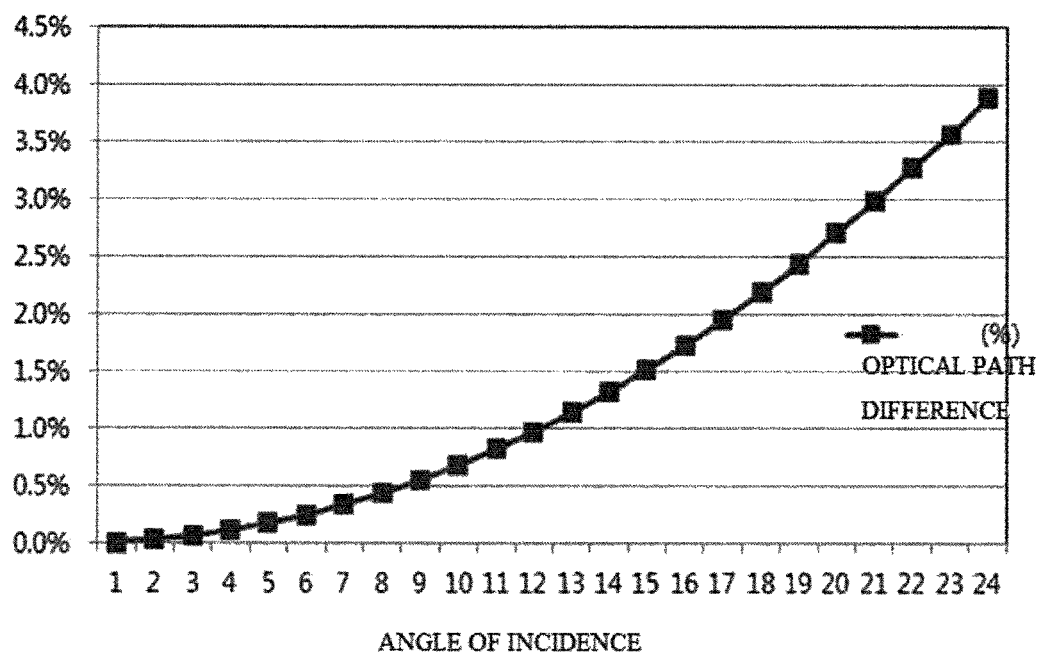
FIG. 4 is a diagram showing an optical path difference according to change in angle of incidence.
Figure 5:
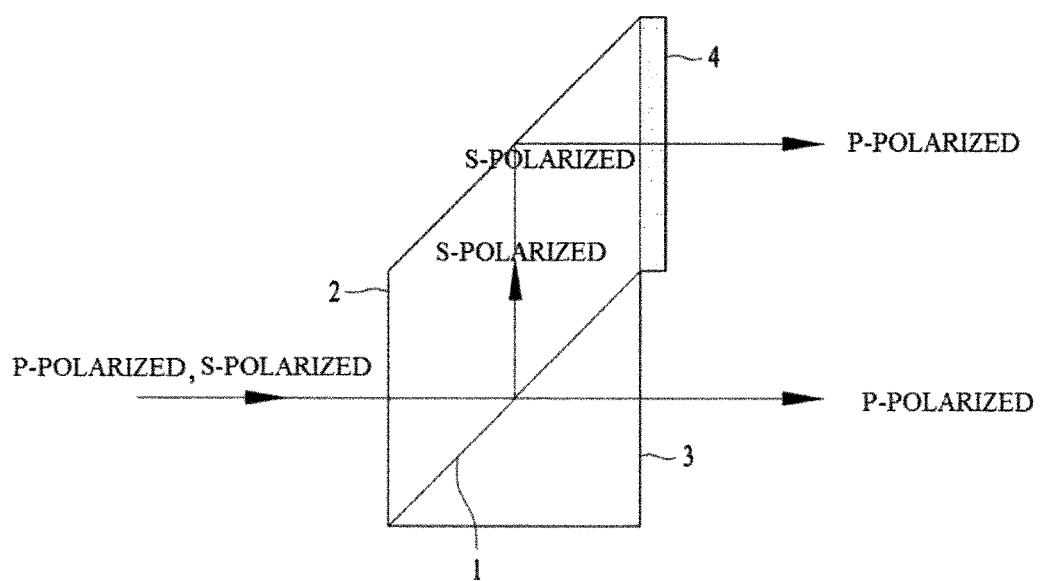
FIG. 5 is a side view of a beam splitter used in a stereoscopic image device for high-luminance stereoscopic image implementation.
Figure 6:
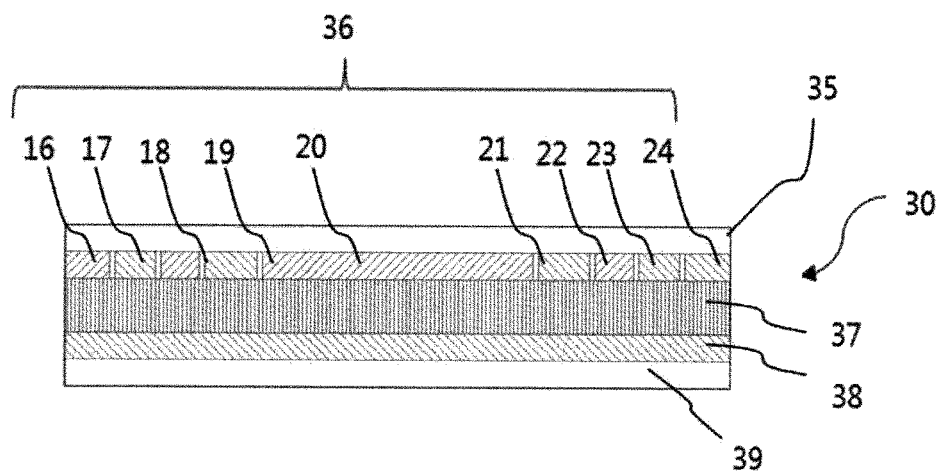
FIG. 6 is a cross-sectional view of a modulator according to an embodiment of the present invention.

FIG. 6 is a cross-sectional view of a modulator according to an embodiment of the present invention.

As shown in FIG. 6, the modulator according to the embodiment of the present invention includes a first substrate 39 and a second substrate 35 forming an appearance thereof. The first and second substrates 35 and 39 may be formed of a transparent material. A first electrode 38 and a second electrode 36 may be provided between the first substrate 39 and the second substrate 35 and a liquid crystal part 37 may be provided between the first electrode 38 and the second electrode 36.

Any one of the first electrode 38 and the second electrode 36 may function as a common electrode and the other thereof may include separated electrodes. Different voltages may be applied to the separated electrodes and the separated electrodes are insulated.

The first electrode 38 and the second electrode 36 are transparent electrodes and may be formed of a transparent conductive inorganic material such as indium tin oxide (ITO) or ZnO, for example.

In FIG. 6, if the first electrode 38 is a common electrode and the second electrode 36 includes separated electrodes, an electrode provided at the center of the second electrode 36 may be defined as a center electrode 20 and electrodes provided outside thereof may be defined as outer electrodes 16, 17, 18, 19, 21, 22, 23 and 24.

Alternatively, the second electrode 36 may be a common electrode and the first electrode 38 may include separated electrodes or both the first and second electrodes 36 and 38 may include separated electrodes.

Figure 7:
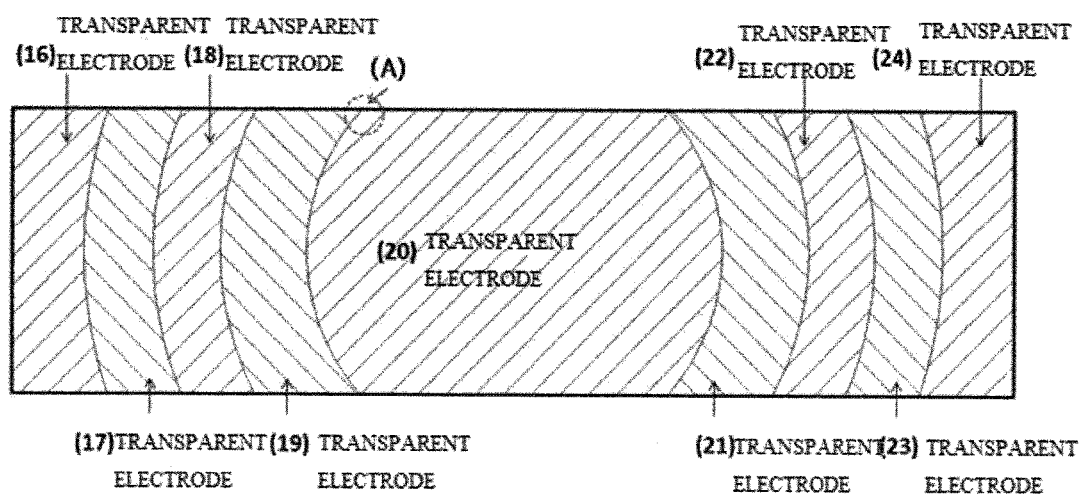
FIG. 7 is a plan view showing arrangement of a center electrode and outer electrodes.

FIG. 7 is a plan view showing arrangement of a center electrode 20 and outer electrodes 16, 17, 18, 19, 21, 22, 23 and 24.

The center electrode and the outer electrodes may be separated and insulated from each other and the plurality of outer electrodes may be separated and insulated from one another. Here, the center electrode 20 and the outer electrodes 16, 17, 18, 19, 21, 22, 23 and 24 may be driven using different voltages. The outer electrodes 16, 17, 18, 19, 21, 22, 23 and 24 may be provided around the center electrode 20.

The electrodes of the modulator are arranged in a shape obtained by cutting upper and lower sides of a concentric circle and the outer electrodes may have a rectangular shape, in correspondence with the shape of the image output from the projector and the shape of the screen or for ease of connection of a connector for supplying a voltage. The angle of incidence of light is smallest in the center electrode 20 and is relatively large in the outer electrodes 16, 17, 18, 19, 21, 22, 23 and 24.

The plurality of outer electrodes 16, 17, 18, 19, 21, 22, 23 and 24 may be arranged at both sides of the center electrode 20 and may be symmetrical with respect to the center electrode 20. In particular, the same voltage may be applied to the outer electrodes spaced apart from the center electrode 20 by the same distance, because the angles of the lights incident on the outer electrode (e.g., 21) spaced apart from the center electrode 20 to the right by a first distance and the outer electrode (e.g., 19) spaced apart from the center electrode 20 to the left by the first distance may be identical.

The outer electrodes 16 and 24, 17 and 23, 18 and 22, and 19 and 21, which are symmetrical with respect to the center electrode 20 and spaced apart from the center electrode 20 by the same distance, form respective pairs and the same voltage may be applied to the outer electrodes forming each pair. To this end, these electrodes may be electrically connected.

The voltage applied to the center electrode 20 may be less than the voltages applied to the outer electrodes 16, 17, 18, 19, 21, 22, 23 and 24 and the applied voltage gradually increases toward the outer electrodes located at the outermost side.

Figure 8:
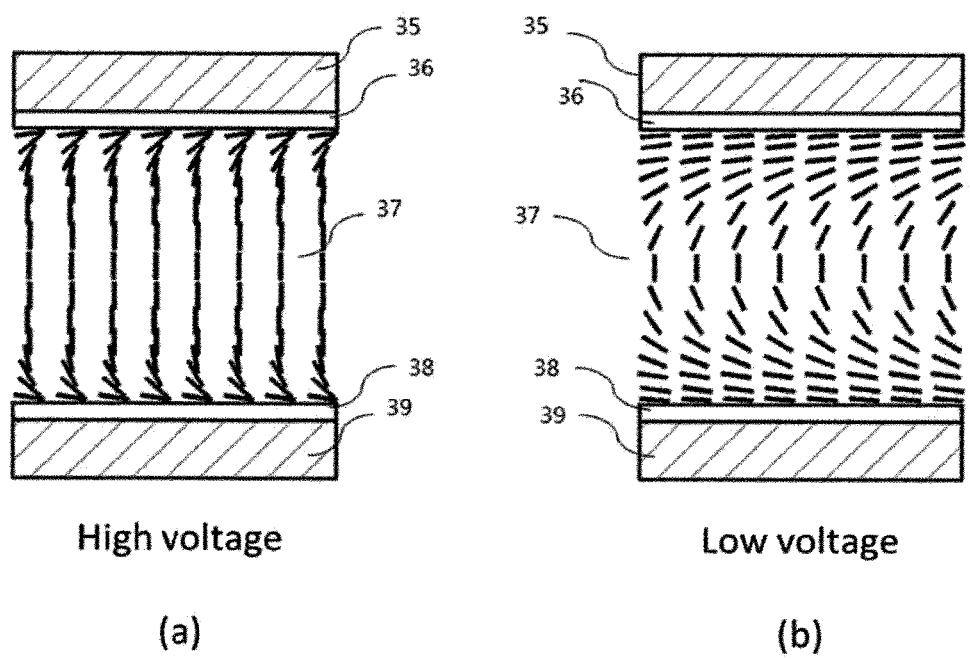
FIG. 8 is a diagram showing a liquid crystal pattern which is changed according to an applied voltage in a modulator according to an embodiment of the present invention.

FIG. 8 is a diagram showing a liquid crystal pattern which is changed according to an applied voltage in a modulator according to an embodiment of the present invention.

When the applied voltage is high, phase retardation is low and, when the applied voltage is relatively low, phase retardation is high. FIG. 8(a) shows arrangement of liquid crystal when an applied voltage is high and thus a potential difference between the first and second electrodes 36 and 38 is high and FIG. 8(b) shows arrangement of liquid crystal when an applied voltage is relatively low and thus a potential difference between the first and second electrodes 36 and 38 is low.

Accordingly, in the structures of FIGS. 7 and 8, when the applied voltage increases from the center electrode 20 toward the outer electrodes 16, 17, 18, 19, 21, 22, 23 and 24, the liquid crystal arrangement state shown in FIG. 8(b) may be formed in the liquid crystal part 37 corresponding to the outer electrodes 16, 17, 18, 19, 21, 22, 23 and 24 and the liquid crystal arrangement state shown in FIG. 8(*a*) may be formed in the liquid crystal part 37 corresponding to the outer electrodes 16, 17, 18, 19, 21, 22, 23 and 24. For example, control is performed such that 5V is applied to the center electrode 20, 5.2V is applied to the outer electrodes 19 and 21, 5.4V is applied to the outer electrodes 18 and 22, 5.6V is applied to the outer electrodes 17 and 23 and 5.8V is applied to the outer electrodes 16 and 24. Therefore, phase retardation increases in the center part of the modulator 30 as compared to the outer part of the modulator 30, thereby reducing phase retardation due to the optical path difference between the outer part and the center part.

Figure 9:
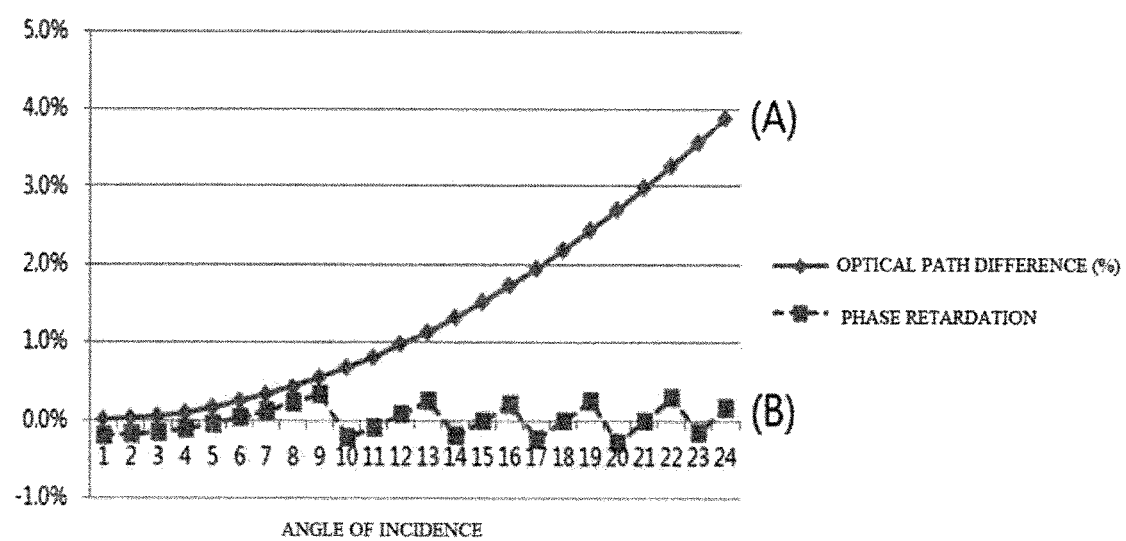
FIG. 9 is a graph of an optical path difference and phase retardation as a result of optimizing a voltage applied to the electrodes shown in FIG. 7.

FIG. 9 is a graph of an optical path difference and phase retardation as a result of optimizing a voltage applied to the electrodes shown in FIG. 7.

Here, a part denoted by (A) is a graph showing change in optical path difference according to the related art and a part denoted by (B) is a graph showing phase change according to the present invention.

(B) shows phase retardation when the voltage applied to the modulator is adjusted according to sections such that optimal circularly polarized light is generated.

In the graph of (B), a phase retardation curve is formed in a sawtooth shape in correspondence with the sections corresponding to the separated electrodes. The slope of the rising section in the sawtooth shape may correspond to that of the optical path difference corresponding to each section in (A).

Referring to the curve of (B) of FIG. 9, even when the angle of incidence increases, phase retardation is changed within a predetermined range. In contrast, in the related art, as the angle of incidence increases, the optical path difference increases and phase retardation increases due to increase in optical path difference.

That is, in the case of (A), in a state of applying the same voltage to the electrodes, as the angle of incidence increases, the optical path difference continuously increases. In contrast, in (B), a part in which phase retardation rapidly decreases means a part between the center electrode and the outer electrode which are separated and insulated from each other or a part between an outer electrode and another outer electrode located outside the outer electrode. Phase retardation does not exceed a predetermined level because the applied voltage is changed according to the position of the electrode (center or outer electrode) as described above.

Among the sawtooth curves shown in (B), the slope of a rising curve is a slope of an optical path difference calculation equation (Equation 1), the phase retardation value substantially vertically decreases in a boundary between the electrodes, and a pattern in which the phase retardation value rises at a lowest point by the above slope and then falls at a next boundary is repeated.

For optimization, the section of the electrode is determined in consideration of the size of the electrode and allowed crosstalk and then the voltage is changed by subtracting a crosstalk average of each section. When the section of the electrode is divided into 6 sections, the sawtooth graph shown in (B) of FIG. 9 can be obtained.

Influence of crosstalk due to the optical path difference/phase retardation may be expressed using a ratio of an area under each curve. When a ratio of the area of a space under the curve (A) to the area of a space under the curve (B) is calculated, the area of the space under the curve (B) is reduced as compared to the area of the space under the curve (A). Thus, influence of crosstalk is remarkably reduced as compared to the related art.

Figure 10:
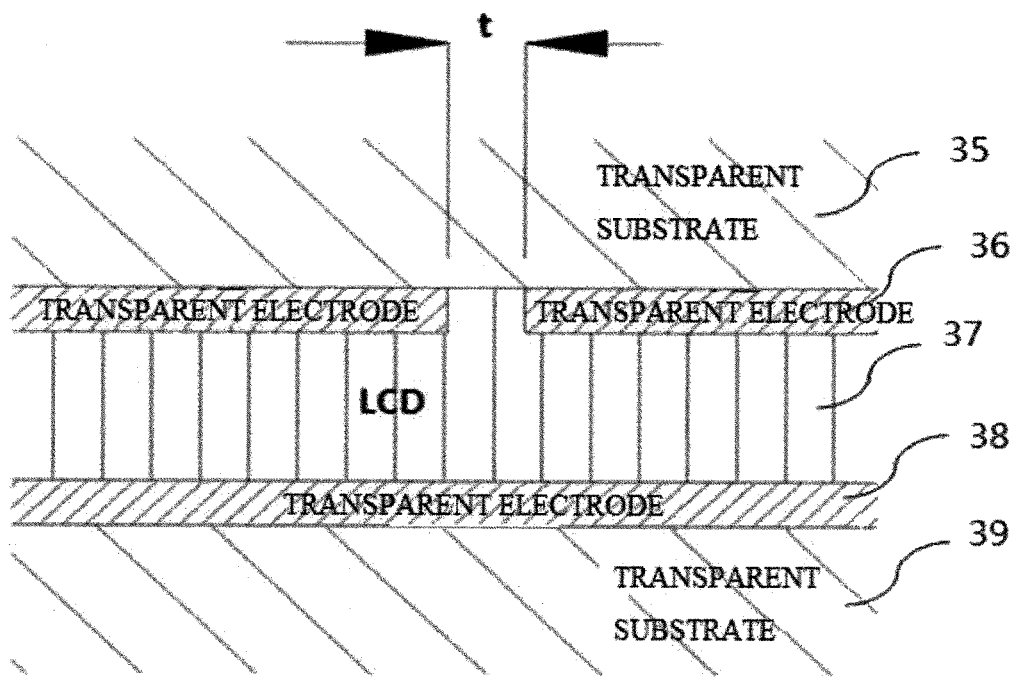
FIG. 10 is a partial cross-sectional view of a modulator according to an embodiment of the present invention.

FIG. 10 is a partial cross-sectional view of a modulator according to an embodiment of the present invention.

As shown in FIG. 10, a gap t is set such that the separated electrodes are insulated from each other such that different voltages are applied to the separated electrodes and the gap may be set to several to several tens of μm such that influence of the speed of light transmitted through the modulator is minimized.

Figure 11:
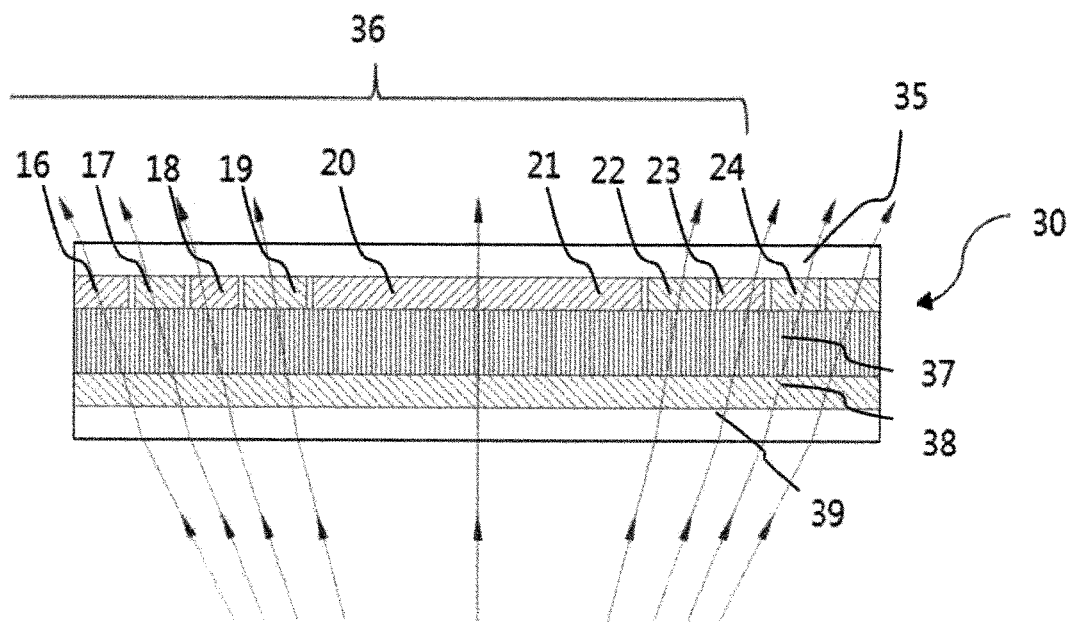
FIG. 11 is a diagram showing a light traveling path according to operation of the present invention.

FIG. 11 is a diagram showing a light traveling path according to operation of the present invention.

Light emitted from the projector may be diffused and input to the modulator 30. At this time, the applied voltage may gradually increase from the center electrode 20 of the second electrode 36 of the modulator 30 toward the outer electrodes 16 to 29 and 21 to 24. Since the voltages applied to the center and outer electrodes are different, a potential difference between the second electrode 36 and the first electrode 38 gradually increases from the center electrode to the outer electrode.

As described above, the phase retardation of the liquid crystal part 37 may increase when the potential difference decreases and decrease when the potential difference increases. The path of light incident on the center part and the path of the light incident on the outer part are not changed according to the potential difference, but the potential difference applied thereto is used to compensate for phase retardation caused by the optical path difference. Therefore, the phase of the light passing through the liquid crystal part of the outer part is not substantially different from that of the light passing through the center part of the liquid crystal part.

Hereinafter, a stereoscopic image device, to which the above-described modulator is applicable, will be described. More specifically, the following stereoscopic image device provides improved luminance as compared to the related art.

Figure 12:
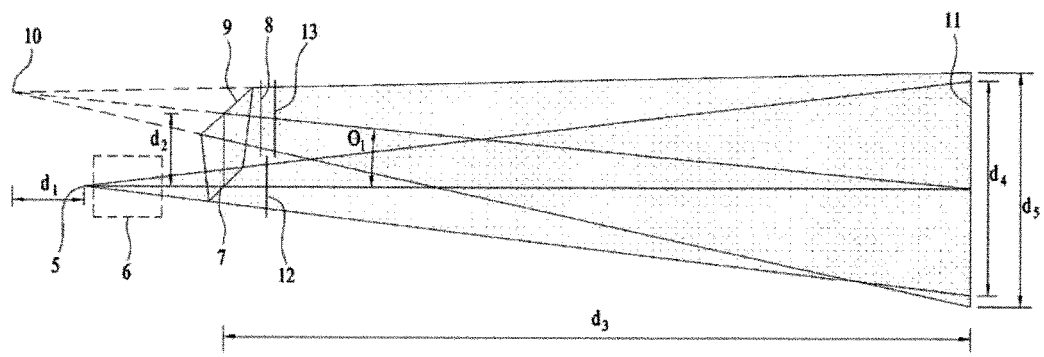
FIG. 12 is a side view showing traveling of light in a stereoscopic image device.

FIG. 12 is a side view showing traveling of light in a stereoscopic image device.

As shown in FIG. 12, light emitted from an image surface 5 for generating an image in a projector is divided into lights having two polarized components by a beam splitter 7 after passing through a projection lens 6. That is, lights having an S-polarized component and a P-polarized component are reflected from the beam splitter 7 or transmitted through the beam splitter 7.

Light having the reflected S-polarized component is reflected from a reflection member 9, is converted into light having a P-polarized component through a half-wavelength retarder 8, and is focused on a screen 11 through a modulator 13. At this time, the used modulator 13 may be the modulator described with reference to FIGS. 6 and 7.

The modulator 13 may change the polarized state by an electrical signal. In addition, as described above, different potential differences may be generated between the center electrode and the outer electrode to reduce crosstalk.

The light having the P-polarized component transmitted through the beam splitter 7 reaches the screen 11 after passing through the modulator 12. Accordingly, light emitted from the image surface 5 and having a mixture of polarized components is converted into one P-polarized state by the modulators 12 and 13 and then is directed to the screen 11.

At this time, the origin of the reflected light is a reflected-light image surface 10, which may be separated from the transmitted-light image surface 5 by a distance $d_1$. Accordingly, the sizes, that is, the heights, of the transmitted and reflected lights onto the screen 11 are $d_4$ and $d_5$, which are different from each other and thus cannot be used without change.

In FIG. 12, assume that an angle between the optical axes of the lights reflected from and transmitted through the beam splitter 7 on the screen 11 is $\theta_1$. If the value $\theta_1$ is very small or the distance $d_3$ from the beam splitter 7 to the screen 11 is significantly greater than the distance $d_2$ from the beam splitter 7 to the reflection member 9, a gap between the image surface 5 of the transmitted light and the image surface 10 of the reflected light is approximately equal to the distance $d_2$ from the beam splitter 7 to the reflection member 9. The size $d_4$ of the light transmitted through the beam splitter 7 on the screen 11 is less than the size $d_5$ of the reflected light.

The sizes of the transmitted light and the reflected light on the screen 11 may be equal, as described above.

Figure 13:
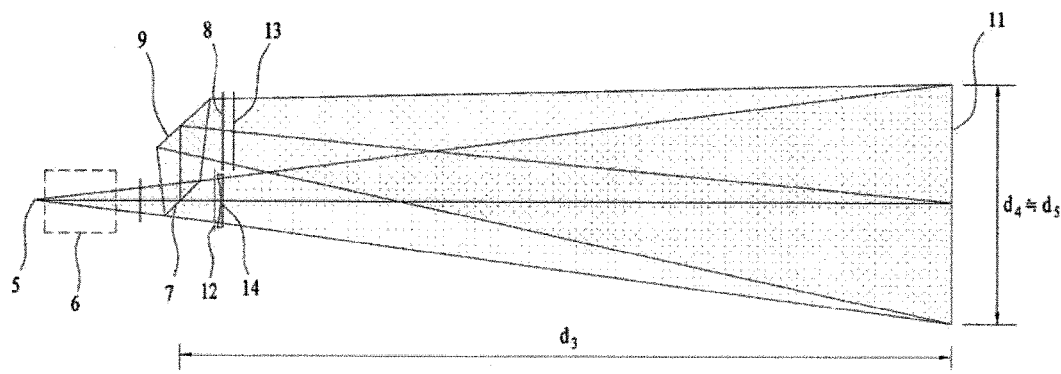
FIGS. 13 and 14 are diagrams illustrating a method of adjusting an optical path difference between lights transmitted and reflected by the beam splitter.

FIG. 13 shows a method of adjusting the height $d_4$ of the light transmitted through the beam splitter 7 on the screen 11 to the height $d_5$ of the reflected light on the screen 11 by increasing the size of an image using a lens 14 on the optical path of the transmitted light.

This method seems to be simple. However, since the magnification of the lens 14 should be changed according to the distance $d_3$ between the beam splitter 7 and the screen 11, many types of lenses are prepared according to theater conditions to select a suitable lens according to the distance $d_3$. The number of required lenses can be reduced by using a zoom lens, but the number of individual lenses of the zoom lens should be restricted to 2 or 3 due to transmissivity, size and price. Although a zoom position is adjusted in correspondence with a projection system, various types of zoom lenses are required.

Accordingly, substantial manpower is needed to design, manufacture and maintain the lens 14.

Since the curvature and material of the lens 14 are restricted, the diameter, that is, the valid diameter, of the lens 14 is restricted. This means that, when the divergence angle of light emitted from the projection lens 6 is large, it is difficult to use this method. Therefore, this method is applicable to an image system having a relatively small divergence angle.

Figure 14:
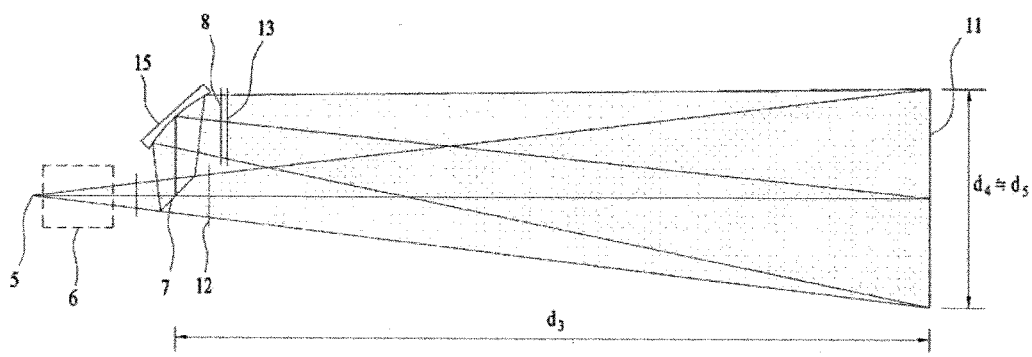

FIG. 14 shows a method of using a reflection member 15, such as a mirror, having a predetermined curvature, instead of the lens 14 of FIG. 13. In this case, the curvature of the reflection member 15 is about 5 Km and thus such a reflection member cannot be manufactured. Although the reflection member can be manufactured, since a difference between the optical axis of the reflection member 15 and the optical axis of the reflected light is large, an aberration is large and focusing is not easy. Therefore, an image on the screen 11 is distorted and thus the reflection member cannot be substantially used.

Figure 15:
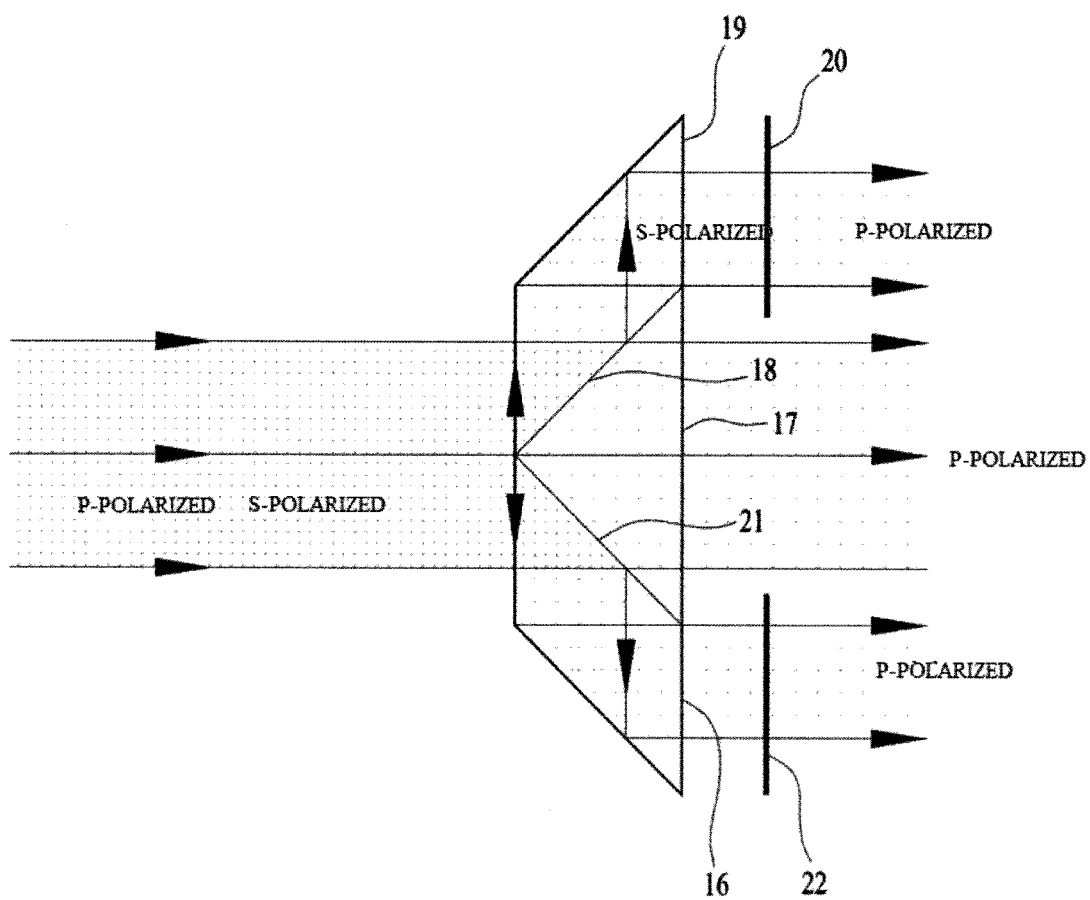
FIG. 15 is a diagram illustrating an example of technology of separating polarized light and then collecting the polarized lights in the same direction.

Another example of technology of separating polarized lights and then collecting the polarized lights in the same direction is shown in FIG. 15.

In FIG. 15, a mixture of P-polarized light and S-polarized light is input to the beam splitter 18 provided between optical members 17 and 19, such as prisms, the P-polarized light is transmitted and S-polarized light is reflected. In addition, by a beam splitter 21 provided between other optical members 16 and 17, the P-polarized light is transmitted and the S-polarized light is reflected. The reflected S-polarized lights are converted into P-polarized lights by half-wavelength retarders 20 and 22.

According to the configuration of FIG. 15, the P-polarized light is theoretically entirely transmitted, but the S-polarized light is halved and reflected in terms of the diameter of incident light. This technology is used to align the polarized light of the light emitted from a light source such as a lamp to specific polarized light (e.g., P-polarized light) and to utilize the aligned polarized light in a liquid crystal display device.

Hereinafter, a stereoscopic image device capable of efficiently solving the above-described optical path difference problem will be proposed.

Figure 16:
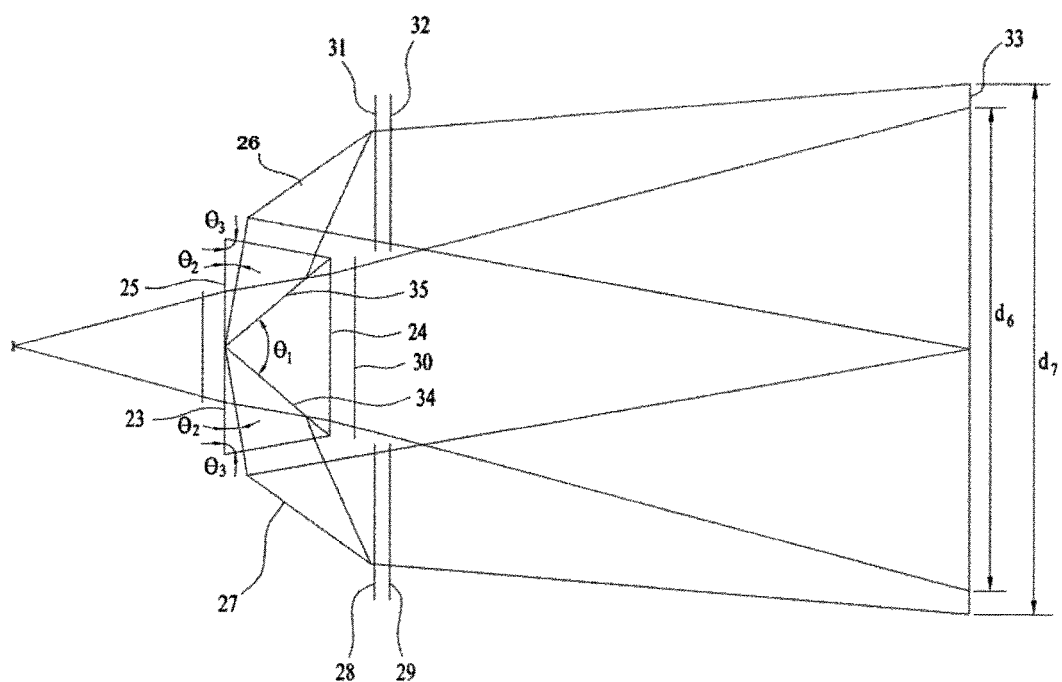
FIG. 16 is a side view showing traveling of light in a stereoscopic image device according to an aspect of the present invention.

FIG. 16 is a side view showing traveling of light in a stereoscopic image device according to an aspect of the present invention.

As shown in FIG. 16, the stereoscopic image device according to the embodiment of the present invention may include beam splitters 34 and 35 for reflecting or transmitting incident light according to polarized components, prisms 23, 24 and 25 provided outside the beam splitters 34 and 35 to surround the beam splitters 34 and 35, and reflection members 26 and 27 for reflecting the light reflected from the beam splitters 34 and 354 toward a screen 33 again.

In addition, half-wavelength retarders 28 and 31 for converting light directed to the screen into another polarized component (e.g., converting S-polarized light into P-polarized light) and modulators 29 and 32 for modulating the converted light (e.g., modulating linearly polarized light into circularly polarized light) may be provided behind the reflection members 26 and 27. At this time, the modulators 29 and 32 may have the above-described structures described with reference to FIGS. 6 and 7.

The beam splitters 34 and 35 may include two inclined beam splitters, which, for convenience, are defined as a first beam splitter 34 and a second beam splitter 35. The first beam splitter 34 and the second beam splitter 35 may be provided at a predetermined angle therebetween.

The P-polarized light input to the first beam splitter 34 passes through the first beam splitter 34 and the S-polarized light is reflected downward. The P-polarized light input to the second beam splitter 35 passes through the second beam splitter 35 and the S-polarized light is reflected upward.

The prisms 23, 24 and 25 include a plurality of unit prisms and may have beam splitters 34 and 35 provided therein. In particular, the first beam splitter 34 may be located at the boundary (adhesion surface) between the first unit prism 23 and the second unit prism 24 and the second beam splitter 35 may be located at the boundary (adhesion surface) between the second unit prism 24 and the third unit prism 25, through a coating process.

Light input to the beam splitters 34 and 35 may be input to the beam splitters 34 and 35 through the incident surface of the prisms 23 and 25. Light reflected or transmitted by the beam splitters 34 and 35 may be emitted through exit surfaces of the prisms 23, 24 and 25. Here, light reflected from the first beam splitter 34 should not interfere with the incident surface of the first unit prism 23 and the exit surface of the second unit prism 24 and light reflected from the second beam splitter 35 should not interfere with the incident surface of the third unit prism 25 and the exit surface of the second unit prism 24. To this end, the angle $\theta_1$ between the two sides of the second unit prism 24 may be less than 90 degrees.

An angle $\theta_2$ between the incident surface of the first unit prism 23 and light reflected from the first beam splitter 34 and an angle $\theta_2$ between the incident surface of the third unit prism 25 and light reflected from the second beam splitter 35 should be equal to or greater than 0.1 degrees.

If light reflected from the first beam splitter 34 passes through the first unit prism 23, the exit surface of the first unit prism 23 may be flat such that an additional aberration does not occur due to refraction. This condition is applicable to the case where the light reflected from the second beam splitter 35 passes through the third unit prism 25.

To this end, the angle $\theta_3$ between the incident surface and exit surface of the first unit prism 23 and the angle $\theta_1$ between the two sides of the second unit prism 24 may have the same value ($\theta_1=\theta_3$). In addition, the angle $\theta_3$ between the incident surface and exit surface of the second unit prism 24 and the angle $\theta_1$ between the two sides of the second unit prism 24 may have the same value ($\theta_1=\theta_3$).

By such a configuration, light transmitted through the beam splitters 34 and 35 may projected onto the screen 33 through the first modulator 30. Light reflected from the beam splitters 34 and 354 may be projected onto the screen 33 through the second and third modulators 29 and 32 to overlap the light passing through the transmission path on the screen 33.

Figure 17:
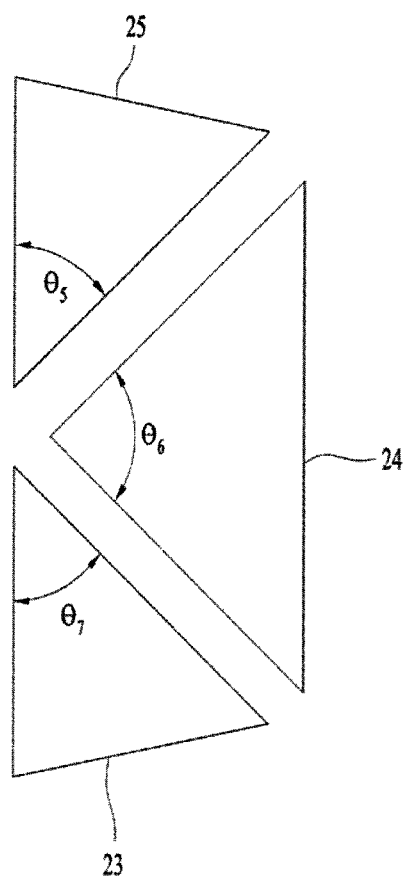
FIGS. 17 and 18 are diagrams showing states in which prisms are separated and coupled in one embodiment of the present invention.
Figure 18:
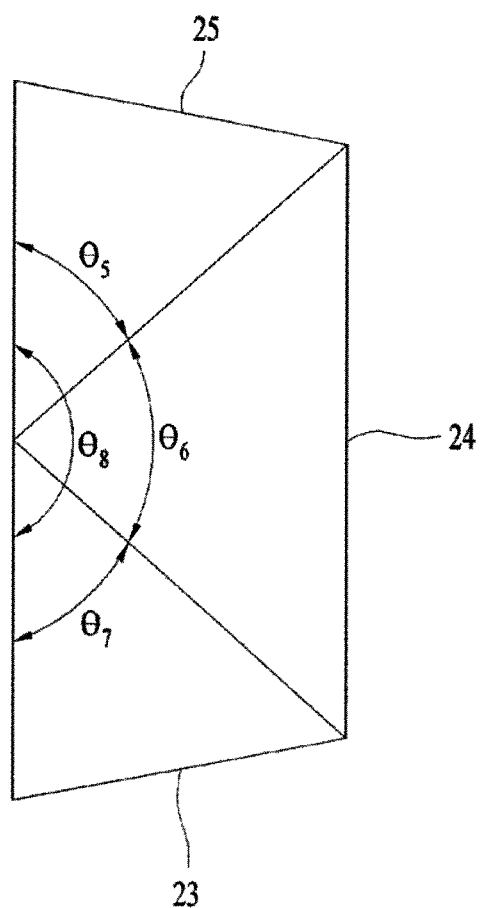

FIGS. 17 and 18 are diagrams showing states in which prisms are separated and coupled in one embodiment of the present invention.

That is, FIG. 17 shows the case where the unit prisms configuring the prism are separated and FIG. 18 shows the case where the unit prisms are coupled.

In FIG. 17, when the unit prisms are manufactured, angles $\theta_5$, $\theta_6$ and $\theta_7$ are formed. Here, the angle means an angle between the incident surface and the adhesion surface (the surface adhered to the second unit prism), in the case of the first and third unit prisms 23 and 25. In the case of the second unit prism 24, the angle means an angle between two adhesion surfaces (the surface adhered to the first unit prism and the surface adhered to the third unit prism) excluding the exit surface.

This angle may have a predetermined tolerance $\delta$ as compared to a theoretical value. When the unit prisms are manufactured using an optical material, slight errors may occur even when manufacturing accuracy is high.

Accordingly, as shown in FIG. 18, the theoretical angle $\theta_8$ between the incident surface of the first unit prism 23 and the incident surface of the third unit prism 25 should be 180 degrees. However, the actual angle obtained by summing the angle $\theta_7$ between the incident surface and adhesion surface of the first unit prism 23, the angle $\theta_6$ between the two adhesion surfaces of the second unit prism 24 and the angle $\theta_5$ between the incident surface and adhesion surface of the third unit prism 25 may be 180 degrees±$\delta$°.

If such a tolerance occurs, the incident surface of the first unit prism 23 and the incident surface of the third unit prism 25 may be separated or may overlap. Accordingly, the image quality of the image implemented on the screen may deteriorate by light passing through the separated portion or the overlapping portion.

If the distance from the projector and the screen is L and an overlapping or separated distance is $\Delta$, $\Delta$ may be expressed as follows.

$$\Delta \approx L*\mathrm{Tan}(\delta) \qquad \text{Equation 2}$$

For example, in the case of L=25 m and $\delta$=3' (sec), $\Delta \approx 22$ mm. Accordingly, it is difficult to substantially use the prism.

A tolerance of 3' is currently achievable machining accuracy. For example, even in super fine machining of $\delta$=1', the deviation of the screen is about 7 mm and thus it is difficult to use the prism.

Figure 19:
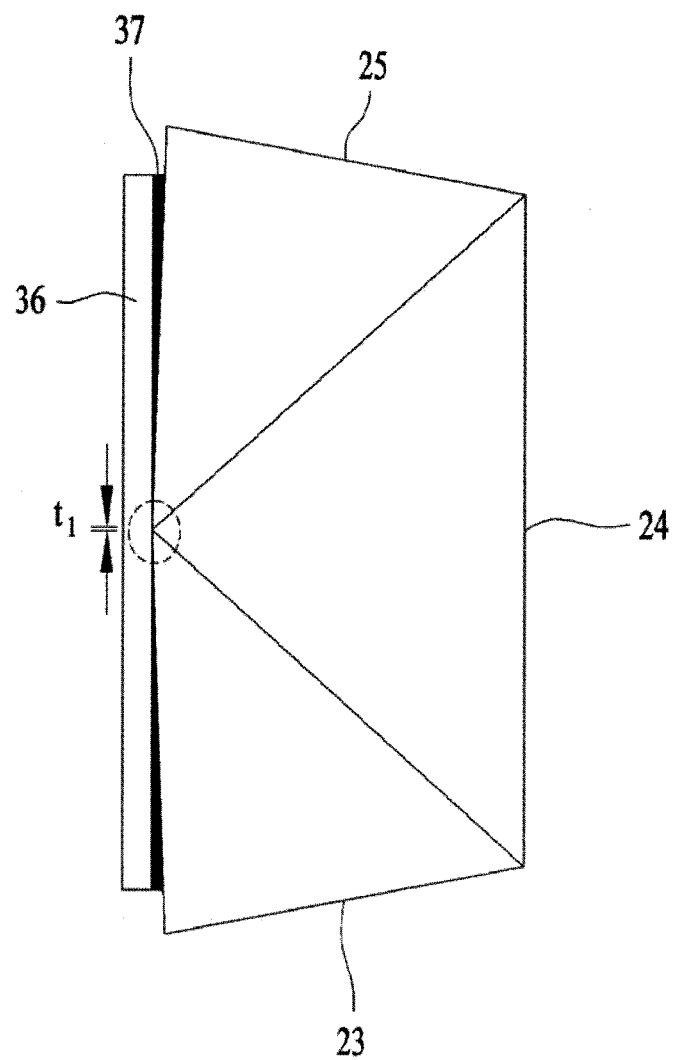
FIG. 19 is a diagram showing a state in which a substrate is attached to a prism in one embodiment of the present invention.

Accordingly, in order to improve this problem, in the embodiment of the present invention, as shown in FIG. 19, a substrate 36 is provided over the incident surface of the first unit prism 25 and the incident surface of the third unit prism 23.

FIG. 19 is a diagram showing a state in which a substrate is attached to a prism in one embodiment of the present invention.

The substrate 36 is composed of a transparent optical member, through which light is transmitted, and may be flat. The substrate 36 covers a gap formed between the incident surface of the first unit prism 23 and the incident surface of the third unit prism to prevent light from directly entering the gap, thereby preventing light energy loss. Here, light energy loss means unexpected change in light traveling path, such as light scattering, diffused reflection, refraction, or dissipation.

The refractive index of the substrate 36 may be equal or similar to that of the prisms 23, 24 and 25, in order to prevent additional refraction between the substrate 36 and the prism 23, 24 and 25. Accordingly, light passing through the substrate 36 is input to the first and third unit prisms 23 and 25 and then is input to the beam splitters 34 and 35 to be reflected or transmitted by the beam splitters 34 and 35 according to the polarized components thereof.

An adhesive layer 37 may be formed such that the substrate 36 is provided on the incident surface of the first unit prism 23 and the incident surface of the third unit prism 25, thereby stably locating the substrate 36.

As the material of the adhesive layer 37, a transparent adhesive material having a refractive index equal or similar to those of the first and third unit prisms 23 and 25 and the substrate 36 may be used to suppress occurrence of an aberration.

Figure 20:
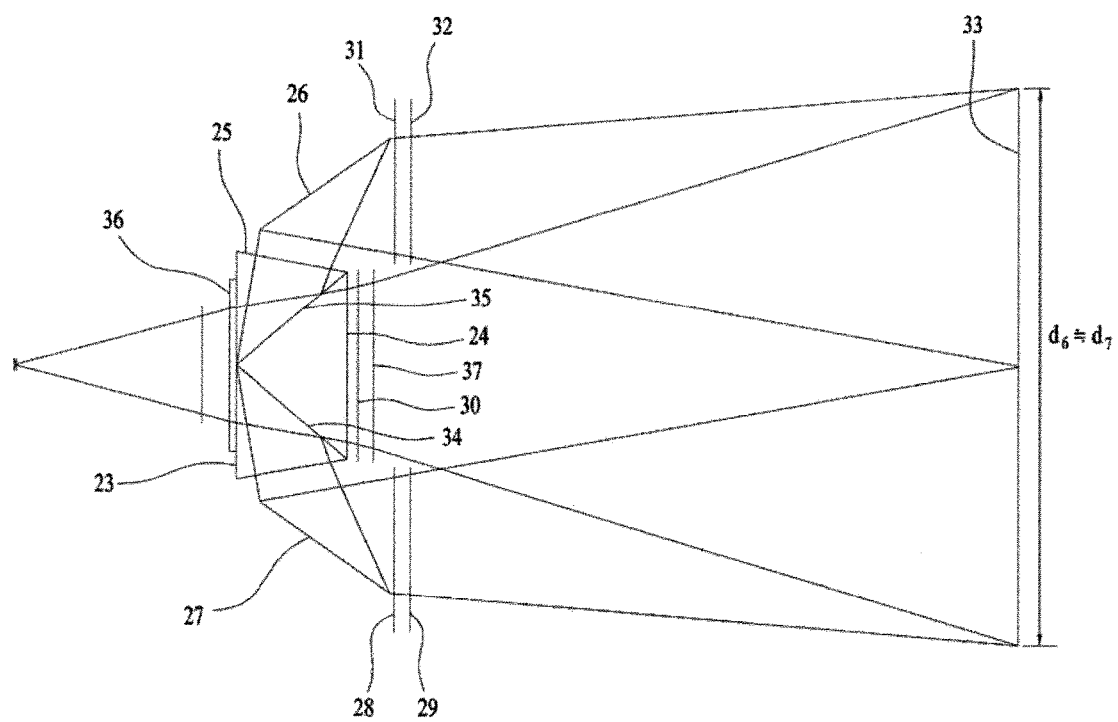
FIG. 20 is a side view showing traveling of light in a stereoscopic image device having the prism, the substrate and the lens of the transmission path.

FIG. 20 is a side view showing traveling of light in a stereoscopic image device having the prism, the substrate and the lens of the transmission path.

FIG. 20 shows a method of minimizing a difference between the size $d_6$ of an image formed by the transmitted light and the size $d_7$ of an image formed by the reflected light in the system shown in FIG. 16.

In the embodiment of FIG. 20, the image formed by the transmitted light is enlarged such that the size thereof is equal to that of the image formed by the reflected image. To this end, the lens 37 is provided on the path of the light transmitted through the beam splitters 34 and 35 and the second unit prism 24 to adjust the size of the image formed by the transmitted light.

Figure 21:
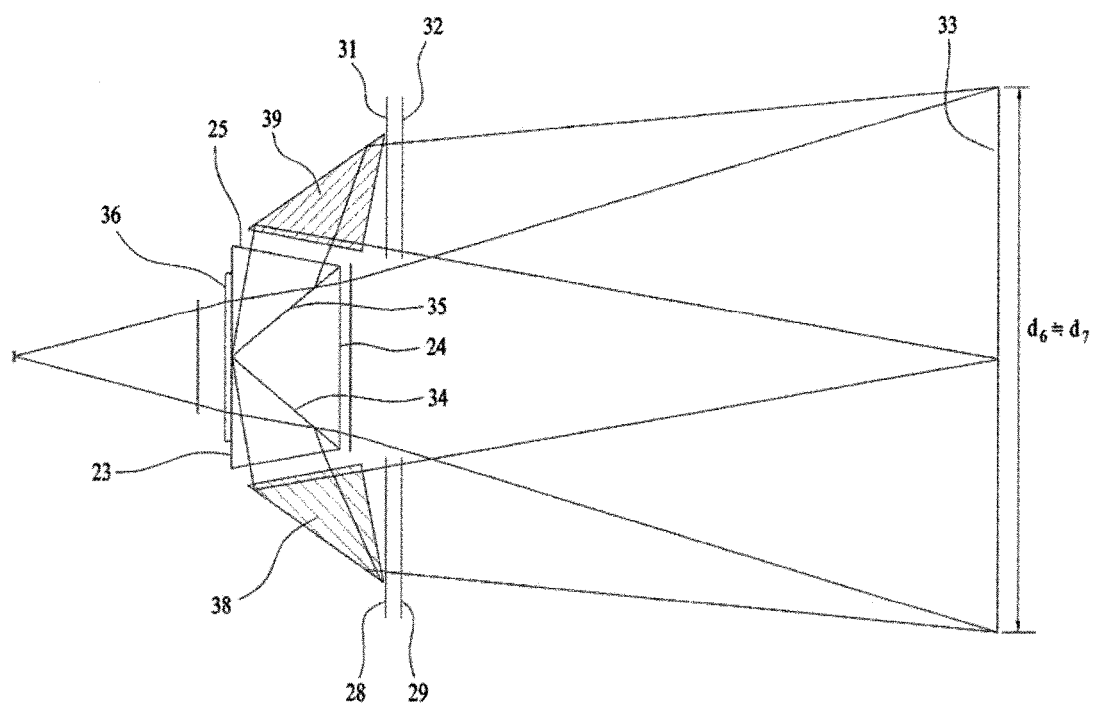
FIG. 21 is a diagram showing another method of removing a difference between the size of an image formed by the transmitted light and the size of an image formed by the reflected light in the system shown in FIG. 16.

FIG. 21 shows another method of removing a difference between the size $d_6$ of an image formed by the transmitted light and the size $d_7$ of an image formed by the reflected light in the system shown in FIG. 16.

In the embodiment of FIG. 21, the image formed by the reflected light is reduced such that the size thereof is equal to that of the image formed by the transmitted image. To this end, reflection member-prism assemblies 38 and 39 including a reflection member and a prism are provided on the path of the reflected light, instead of a reflection member such as a mirror. Accordingly, when light reflected from the beam splitters 34 and 35 and passing through the first and third unit prisms 23 and 25 passes through the reflection member-prism assemblies 38 and 39, the size of the image may be reduced as compared to the state of FIG. 16 to be equal to that of the image formed by the transmitted light.

Figure 22:
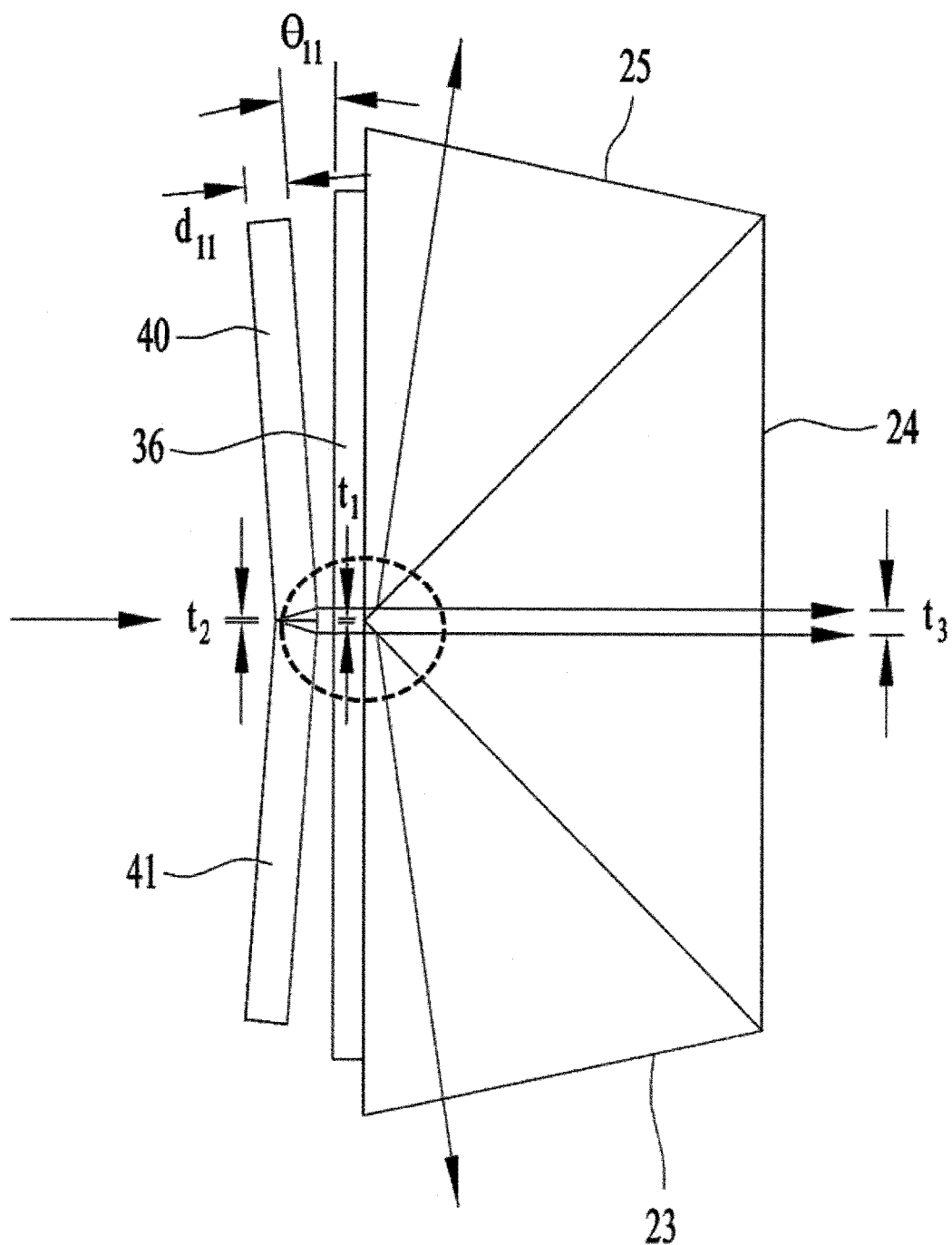
FIG. 22 is a diagram showing a method of increasing optical efficiency as compared to FIGS. 16, 18, 19 and 20.

FIG. 22 shows a method of increasing optical efficiency as compared to FIGS. 16, 18, 19 and 20.

In FIG. 22, when the unit prisms are adhered, the apexes of the unit prisms are present in a portion denoted by a dotted circle. In particular, a fine space may be formed in the boundary between the incident surface of the first unit prism 23 and the incident surface of the third unit prism 25. The size of this space is defined as $t_1$. $t_1$ is generally 0.1 to 0.2 mm. In this case, light transmitted through this space is scattered to cause light loss.

In order to prevent such light loss, in the present embodiment, refraction members 40 and 41 may be provided in front of the substrate 36. When the refraction members 40 and 41 are divided into a first refraction member 40 and a second refraction member 41 for convenience, the angle between the first refraction member 40 and the second refraction member 41 is not 180 degrees (flat), but may be less or greater than 180 degrees. That is, the angle between the incident surface of the first refraction member 40 and the incident surface of the second refraction member 41 may be less than 180 degrees and the angle between the exit surface of the first refraction member 40 and the exit surface of the second refraction member 41 may be greater than 180 degrees.

If it is assumed that the refraction members 40 and 41 are manufactured by bending a flat optical member, the bending angle is less than 180 degrees at the side of the incident surface and is greater than 180 degrees at the side of the exit surface. In the case where the first refraction member 40 and the second refraction member 42 are connected, a gap therebetween may not be present or a fine gap $t_2$ may be present.

By such a configuration, when light is input to the refraction members 40 and 41, light is separated at the connection in the vertical direction, thereby preventing light from entering the space $t_1$ in the boundary between the incident surface of the first unit prism 23 and the incident surface of the third unit prism 25. More specifically, the direction of light separated at the connection is changed at the exit surfaces of the refraction members 40 and 41 such that the lights are maintained in parallel in a state of being separated. At this time, a gap may be $t_3$. Since the gap $t_3$ is greater than the space $t_1$, it is possible to prevent light energy loss from being generated due to the space.

Even when the gap $t_2$ is generated, since the gap may have a value of several tens of μm, light loss is not caused.

Hereinafter, a stereoscopic image device for improving luminance using total reflection according to another aspect of the present invention will be described.

In the embodiment of FIG. 21, in the reflection member-prism assemblies 38 and 39, for example, in mirror-prism assemblies, the mirror is manufactured by coating the surface of the prism with aluminum or silver.

Figure 23:
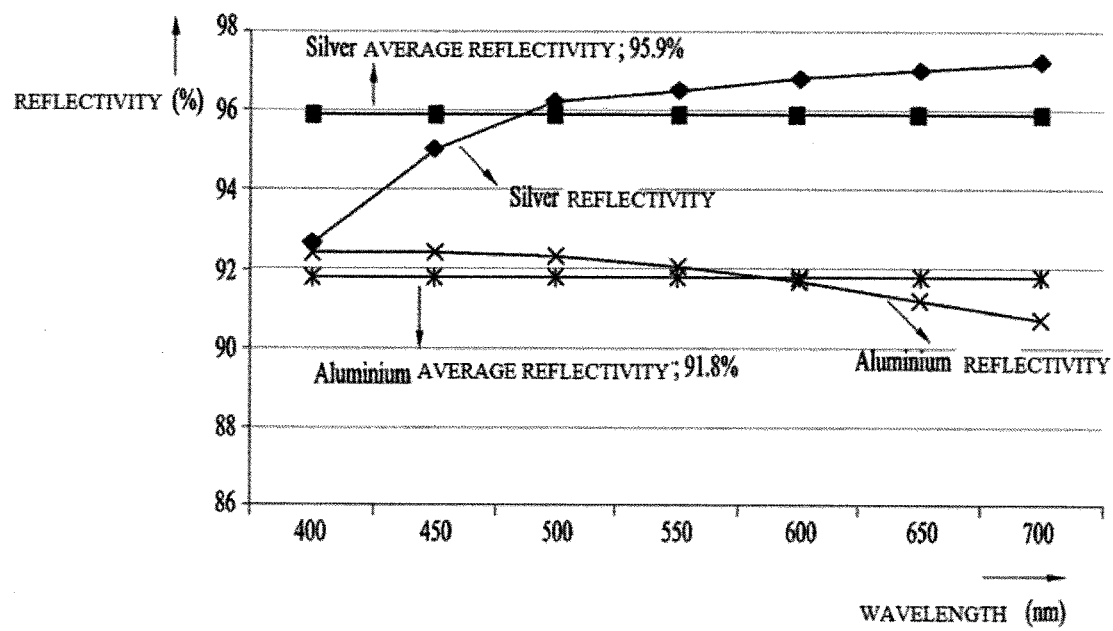
FIG. 23 is a diagram showing reflectivity of a visible light region made of aluminum and silver.

FIG. 23 shows reflectivity of a visible light region made of aluminum and silver, that is, reflectivity when the wavelength of incident light is between 400 nm to 700 nm.

Referring to FIG. 23, reflectivity of silver is higher than that of aluminum by about 5% but silver may be easily corroded due to oxidation as compared to aluminum. Accordingly, the mirror of the mirror-prism assemblies 34 and 35 or the reflection member-prism assemblies may be generally made of aluminum. However, a process of coating the surface of the prism with aluminum increases cost and light loss may occur due to reflection.

In order to improve such disadvantages, in an aspect of the present invention, a method of maximizing reflection efficiency using total reflection is proposed.

Figure 24:
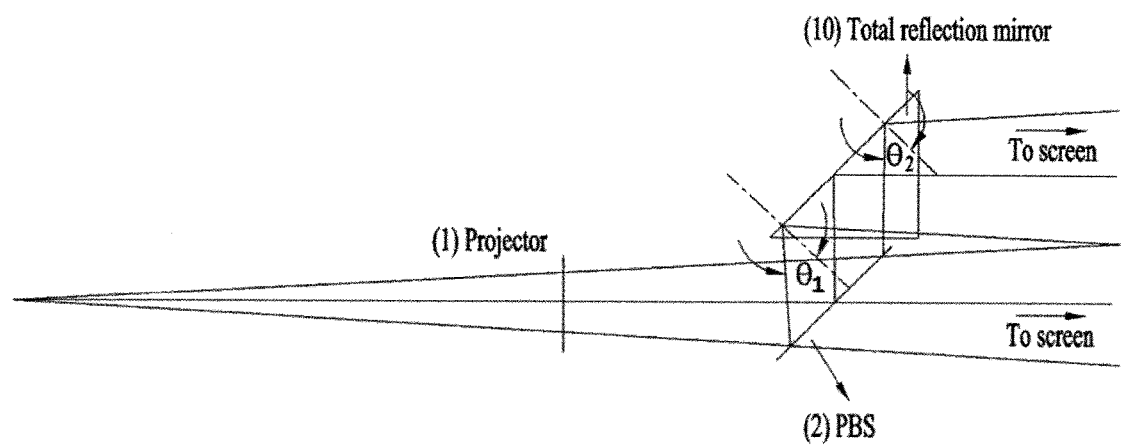
FIG. 24 is a diagram showing a stereoscopic image device according to an embodiment of the present invention.

FIG. 24 is a diagram showing a stereoscopic image device according to an embodiment of the present invention.

For convenience of description, although light is halved by one polarizing beam splitter (PBS), as described with reference to FIG. 21, light may be divided into three or more paths and projected onto the screen.

Referring to FIG. 24, light reflected from the PBS 2 passes through a total reflection mirror 10, which is a prism having two refraction surfaces and one reflection surface, to be radiated toward the screen. Such a total reflection mirror is related to the angle of incidence of light input to the mirror surface.

Figure 25:
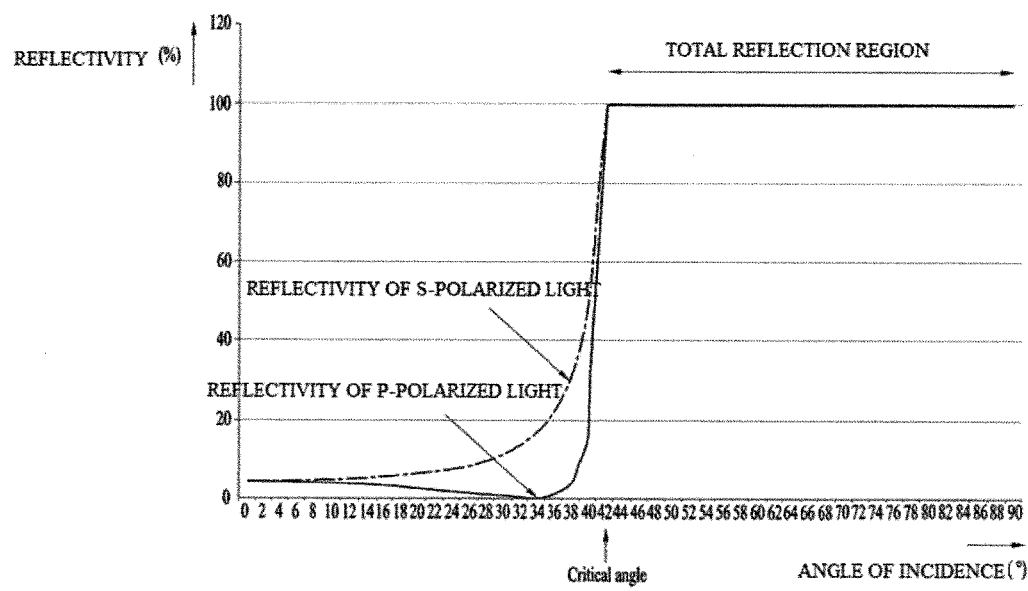
FIG. 25 is a diagram showing reflectivity according to angle of incidence.

FIG. 25 is a diagram showing reflectivity according to angle of incidence. In particular, in FIG. 25, the material of the prism is BK7.

Referring to FIG. 25, a total reflection angle, that is, a critical angle, is about 41.2°. Accordingly, in FIG. 24, when a minimum angle of incidence $\Theta_1$ and a maximum angle of incidence $\Theta_2$ are greater than the critical angle, total reflection occurs. In addition, if light reflected from the prism has an angle of incidence equal to or greater than the critical angle, as shown in FIG. 25, reflectivity is 100%, which is remarkably higher than the reflectivity of aluminum of 98%, thereby improving the luminance of the reflected light.

Such a method is applied to the reflection member-prism assembly of the double- or triple-light stereoscopic image device to improve the total luminance of the image.

Figure 26:
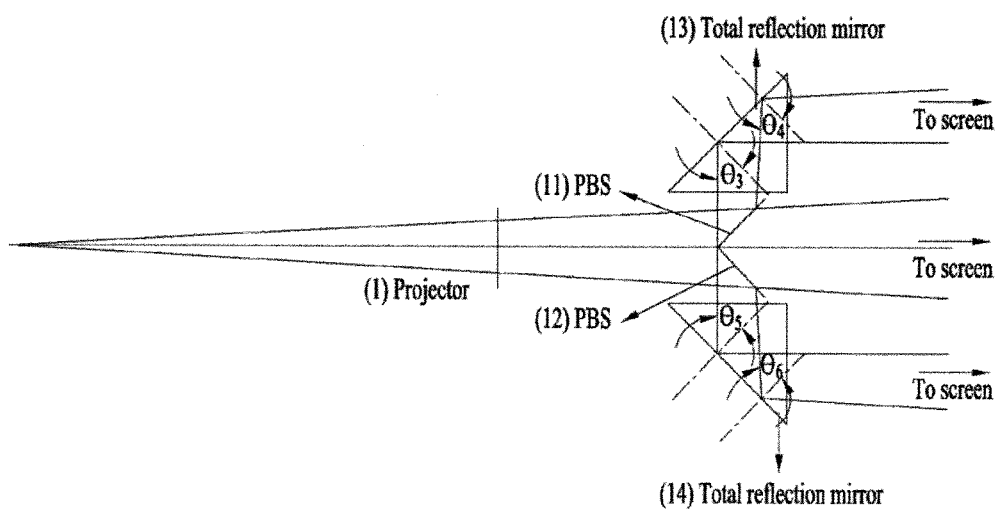
FIG. 26 shows a multi-division stereoscopic image display device according to an embodiment of the present invention.

FIG. 26 shows a multi-division stereoscopic image display device according to an embodiment of the present invention. In particular, in FIG. 26, assume that light is divided into three lights by the PBSs 11 and 12.

Referring to FIG. 26, light emitted from the projector 1 is divided by the PBSs 11 and 12 such that the S-polarized light is reflected and the P-polarized light is transmitted. Here, if minimum angle of incidences $\Theta_3$ and $\Theta_5$ and maximum angle of incidences $\Theta_4$ and $\Theta_6$ of the reflected S-polarized light input to the total reflection mirrors 13 and 14 are equal to or greater than the critical angle, all lights are totally reflected, thereby obtaining reflection efficiency of 100%.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The modulator according to the present invention is available not only in the above-described stereoscopic image device but also in various stereoscopic image devices for displaying a left image and a right image from a projector.

The invention claimed is:

1. A modulator for a stereoscopic image device comprising:
   a first substrate and a second substrate spaced apart from the first substrate;
   first and second electrodes provided between the first substrate and the second substrate; and
   a liquid crystal part provided between the first electrode and the second electrode wherein one or more of the first electrode or the second electrode is divided into a plurality of electrodes so as to apply a plurality of different voltages and the plurality of electrodes are insulated from one another;

wherein the applied voltage is controlled to gradually increase from a center part to an outer part of the first electrode or the second electrode.

2. The modulator according to claim 1, wherein phase retardation of light transmitted through the liquid crystal part is controlled to gradually decrease from a center part to an outer part of the liquid crystal part.

3. The modulator according to claim 1, wherein:
the first electrode or the second electrode includes a center electrode and outer electrodes spaced apart from the center electrode and provided outside the center electrode, and
the center electrode and the outer electrodes are arranged to be insulated from each other.

4. The modulator according to claim 3, wherein:
the outer electrodes include a plurality of outer electrodes spaced apart from one another, and
the outer electrodes are arranged to be insulated from one another.

5. The modulator according to claim 3, wherein voltages applied to the outer electrodes are controlled to be higher than a voltage applied to the center electrode.

6. The modulator according to claim 3, wherein:
the outer electrodes are symmetrical with reference to the center electrode, and
the same voltage is applied to the outer electrodes separated from the center electrode by the same distance.

7. The modulator according to claim 1, wherein, when different voltages are applied to the first electrode or the second electrode,
as a liquid crystal pattern formed in the liquid crystal part, different patterns are formed in correspondence with portions to which different voltages are applied, and
phase retardation occurring in a liquid crystal pattern corresponding to an electrode portion to which a relatively high voltage is applied is less than that occurring in a liquid crystal pattern corresponding to an electrode portion to which a relatively low voltage is applied.

8. A stereoscopic image device comprising:
a projector for projecting a stereoscopic image; and
a modulator for modulating the stereoscopic image projected by the projector into circularly polarized light in a clockwise or counterclockwise direction based on a signal linked with the projector,
wherein the modulator includes a first electrode, a second electrode and a liquid crystal part provided between the first and second electrodes, and
wherein one or more of the first electrode or the second electrode is divided into a plurality of electrodes so as to apply a plurality of different voltages and the plurality of electrodes are insulated from each other;
wherein the applied voltage is controlled to gradually increase from a center part to an outer part of the first electrode or the second electrode.

9. The stereoscopic image device according to claim 8, wherein phase retardation of light transmitted through the liquid crystal part is controlled to gradually decrease from a center part to an outer part of the liquid crystal part.

10. The stereoscopic image device according to claim 8, further comprising a beam splitter for transmitting light having a first polarization direction and reflecting light having a second polarization direction among lights radiated from the projector.

11. The stereoscopic image device according to claim 10, further comprising:
a plurality of unit prisms adhered to each other in the vicinity of the beam splitter to pass light input to the beam splitter and light transmitted or reflected by the beam splitter; and
a substrate for guiding incident light to the plurality of unit prisms in order to prevent light energy loss due to a tolerance occurring upon arranging the plurality of unit prisms in the vicinity of the beam splitter.

12. The stereoscopic image device according to claim 10, further comprising a prism for refracting and reflecting the light reflected by the beam splitter and radiating the light toward a screen
wherein an angle of incidence of the light reflected by the beam splitter to a reflection surface of the prism is equal to or greater than a critical angle for totally reflecting the light reflected by the beam splitter toward the screen.

13. A modulator for a stereoscopic image device comprising:
a first substrate and a second substrate spaced apart from the first substrate;
first and second electrodes provided between the first substrate and the second substrate; and
a liquid crystal part provided between the first electrode and the second electrode wherein one or more of the first electrode or the second electrode is divided into a plurality of electrodes so as to apply a plurality of different voltages to reduce phase retardation of polarized light and the plurality of electrodes are insulated from one another.

14. A stereoscopic image device comprising:
a projector for projecting a stereoscopic image; and
a modulator for modulating the stereoscopic image projected by the projector into circularly polarized light in a clockwise or counterclockwise direction based on a signal linked with the projector,
wherein the modulator includes a first electrode, a second electrode and a liquid crystal part provided between the first and second electrodes, and
wherein one or more of the first electrode or the second electrode is divided into a plurality of electrodes so as to apply a plurality of different voltages to reduce phase retardation of polarized light and the plurality of electrodes are insulated from each other.

* * * * *